(12) United States Patent
Hotary et al.

(10) Patent No.: US 6,709,041 B1
(45) Date of Patent: Mar. 23, 2004

(54) INSTRUMENT PANEL AND CENTER STACK ASSEMBLY

(75) Inventors: James T. Hotary, Holland, MI (US); David B. Busch, Holland, MI (US); Michael E. Wiedeman, Manhattan Beach, CA (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/030,457

(22) PCT Filed: Jul. 7, 2000

(86) PCT No.: PCT/US00/18933
§ 371 (c)(1),
(2), (4) Date: Jun. 28, 2002

(87) PCT Pub. No.: WO01/02208
PCT Pub. Date: Jan. 11, 2001

Related U.S. Application Data

(60) Provisional application No. 60/142,711, filed on Jul. 7, 1999.

(51) Int. Cl.⁷ .............................................. B62D 24/14
(52) U.S. Cl. ......................... 296/70; 296/37.12; 296/74
(58) Field of Search ........................ 296/70, 74, 37.12, 296/37.14, 37.8, 24.1; 180/90

(56) References Cited

U.S. PATENT DOCUMENTS

| | | | | |
|---|---|---|---|---|
| 4,597,461 A | * | 7/1986 | Kochy et al. ................ | 296/72 |
| 5,037,130 A | * | 8/1991 | Okuyama .................... | 296/70 |
| 5,102,181 A | * | 4/1992 | Pinkney ................... | 296/37.12 |
| 5,199,772 A | * | 4/1993 | Jordan ........................ | 312/7.1 |
| 5,282,556 A | * | 2/1994 | Bossert ...................... | 296/37.8 |
| 5,297,709 A | * | 3/1994 | Dykstra et al. ............. | 224/281 |
| 5,461,361 A | * | 10/1995 | Moore ........................ | 340/461 |
| 5,857,726 A | * | 1/1999 | Yokoyama et al. ......... | 296/70 |
| 6,068,295 A | * | 5/2000 | Skabrond et al. ........... | 180/90 |
| 6,095,273 A | * | 8/2000 | Abound et al. .............. | 180/90 |
| 6,129,406 A | * | 10/2000 | Dauvergne .................. | 296/70 |
| 6,276,739 B1 | * | 8/2001 | Wich ........................... | 296/72 |
| 6,354,649 B1 | * | 3/2002 | Lee ............................. | 296/70 |
| 6,388,881 B2 | * | 5/2002 | Yamauchi et al. ........... | 180/90 |
| 6,394,526 B1 | * | 5/2002 | Gyllenspetz ................ | 296/70 |
| 6,464,280 B1 | * | 10/2002 | Shibata et al. .............. | 296/70 |
| 6,464,281 B2 | * | 10/2002 | Volkmann et al. ........... | 296/70 |
| 6,505,876 B1 | * | 1/2003 | Watanabe .................... | 296/70 |

* cited by examiner

*Primary Examiner*—Stephen T. Gordon
*Assistant Examiner*—Greg Blankenship
(74) *Attorney, Agent, or Firm*—Foley & Lardner

(57) ABSTRACT

An instrument panel assembly having a generally symmetrical upper cowl portion (56) defining a cutout region (57) having a center stack assembly (50) disposed within the cutout region (57). The central stack assembly (50) is capable of slidably receiving a number of service modules (58).

44 Claims, 4 Drawing Sheets

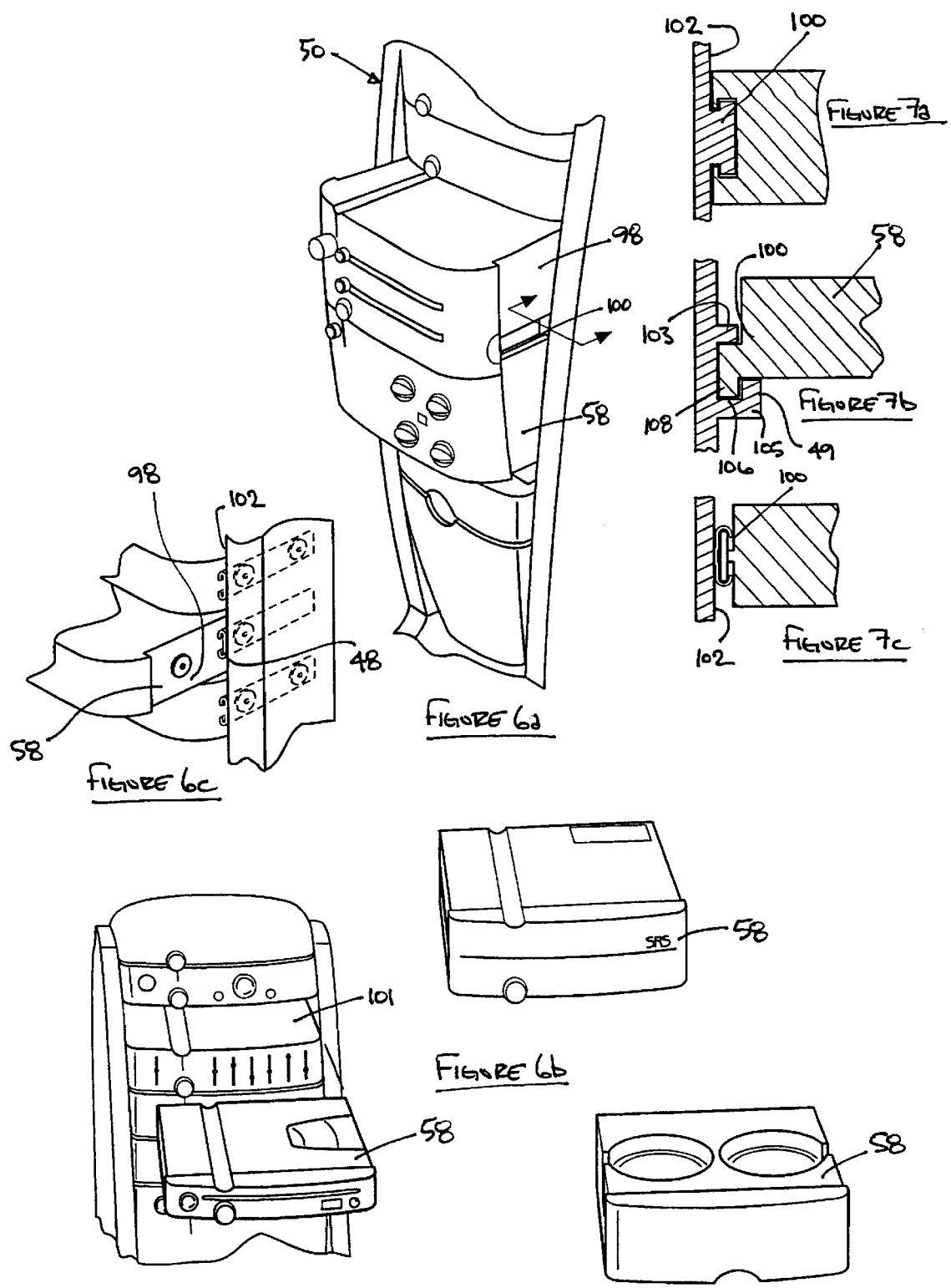

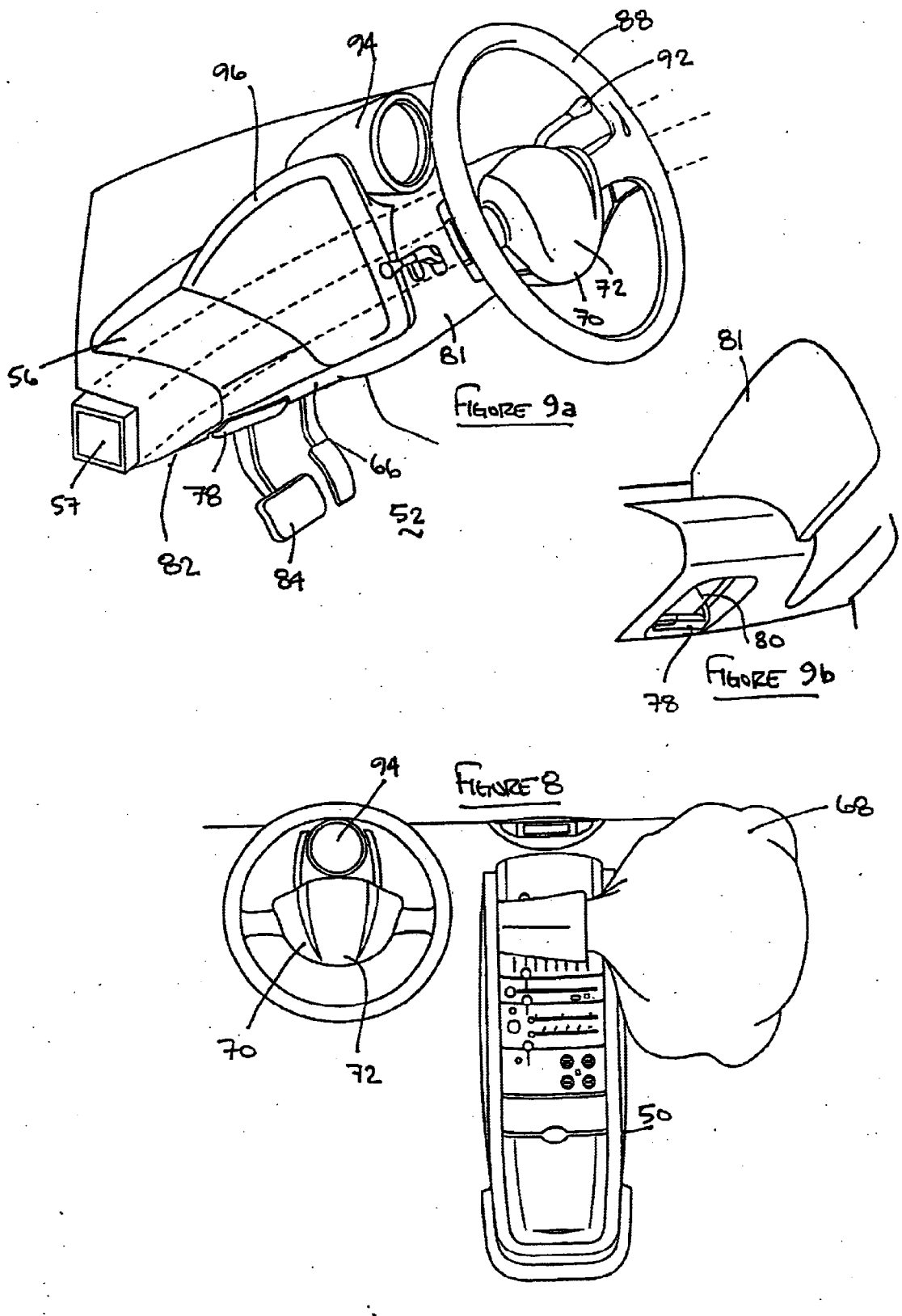

INSTRUMENT PANEL AND CENTER STACK ASSEMBLY

This application claims the benefit of Provisional Application Ser. No. 60/142,711 filed Jul. 7, 2000.

BACKGROUND OF THE INVENTION

1. Technical Field

This invention generally relates to a vehicle interior and, more particularly, to an instrument panel having a center stack assembly capable of slidably receiving service modules.

2. Discussion

With ever increasing pressure from automotive consumers, flexibility and adaptability of vehicle interiors is increasingly required in order to provide a vehicle that meets broad customer demands. Further, with increased social awareness of a vehicle's impact on the environment, there is an increasing demand to minimize the overall mass of vehicle while still meeting the feature requirements of the consumer. By reducing the mass of the interior components of the vehicle, several goals can be achieved. First, the overall weight of the vehicle can be minimized thereby reducing the power and fuel required to operate the vehicle. Secondly, by reducing the mass of the interior components and optimizing the interior volume of the vehicle the energy required to heat or cool the interior of the vehicle can be minimized. In particular, the cooling system of a vehicle accounts for a significant portion of the energy consumption of the vehicle when in use.

SUMMARY OF THE INVENTION

In accordance with the teachings of the present invention, a highly adaptable front cockpit center stack assembly is disclosed which provides mounting for standard and optional features historically mounted in the instrument panel or floor console of the vehicle. The center stack assembly further provides flexibility and adaptability for incorporation of interchangeable modules allowing the customer, dealer, or original equipment manufacturer to vary the content and location of the components mounted to the center stack assembly.

In accordance with the further teachings of the present invention, a steering column system is provided which, particularly when used in conjunction with the center stacked assembly, incorporates additional controls for the vehicle in a preferred ergonomic location relative to the vehicle driver. Specifically included in the system is a paddle shifter system allowing the vehicle driver to sequentially select the vehicle gear in a convenient fashion while maintaining contact with the steering wheel with both hands.

Further disclosed is a light-weight, flexible instrument panel requiring minimal content when used in conjunction with the center stack assembly and thereby providing increased flexibility for right-hand or left-hand drive versions of the vehicle in which it is incorporated. By providing increased space availability in the instrument panel, features such as a parking brake handle and release mechanism can be incorporated into the instrument panel instead of being located in the traditional positions which typically require floor space and reduce the flexibility of the remainder of the interior.

BRIEF DESCRIPTION OF THE DRAWINGS

The various advantages of the present invention will become apparent to one skilled in the art upon reading the following specification and by reference to the drawings in which:

FIGS. 6a–6c show the center stack module receiving a number of service modules in accordance with the teachings of the present invention;

FIGS. 7a–7c are cross-sections of the mounting mechanisms for slidably mounting the service modules of the present invention to the center stack assembly;

FIG. 8 depicts the center stack assembly having a deploying air safety restraint; and FIGS. 9a and 9b depict the steering wheel assembly and parking brake levers incorporated into the instrument panel assembly of the current invention.

DETAILED DESCRIPTION OF THE PREFERRED EMBODIMENTS

Figure 1:
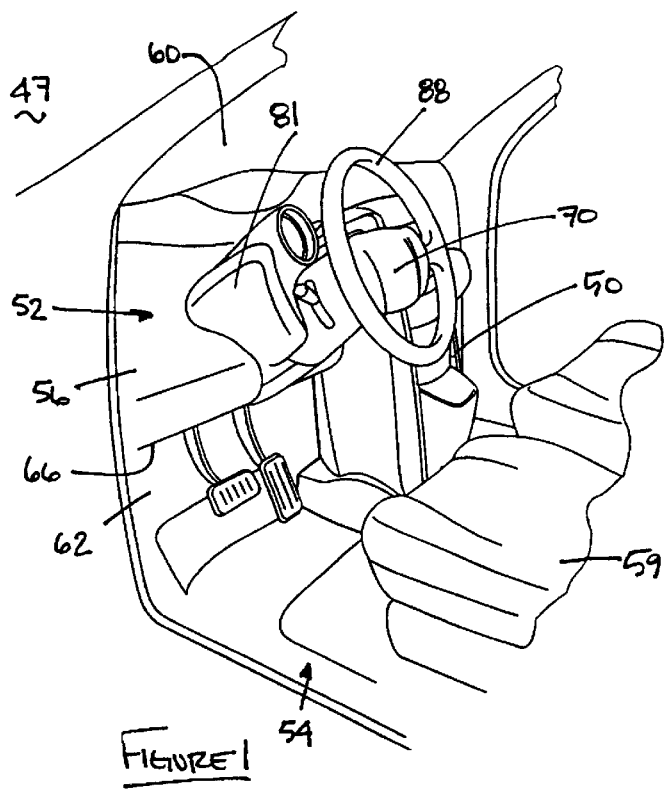
FIGS. 1 and 2 provide perspective views of a center stack assembly and cowl in accordance with the teachings of the present invention.
Figure 2:
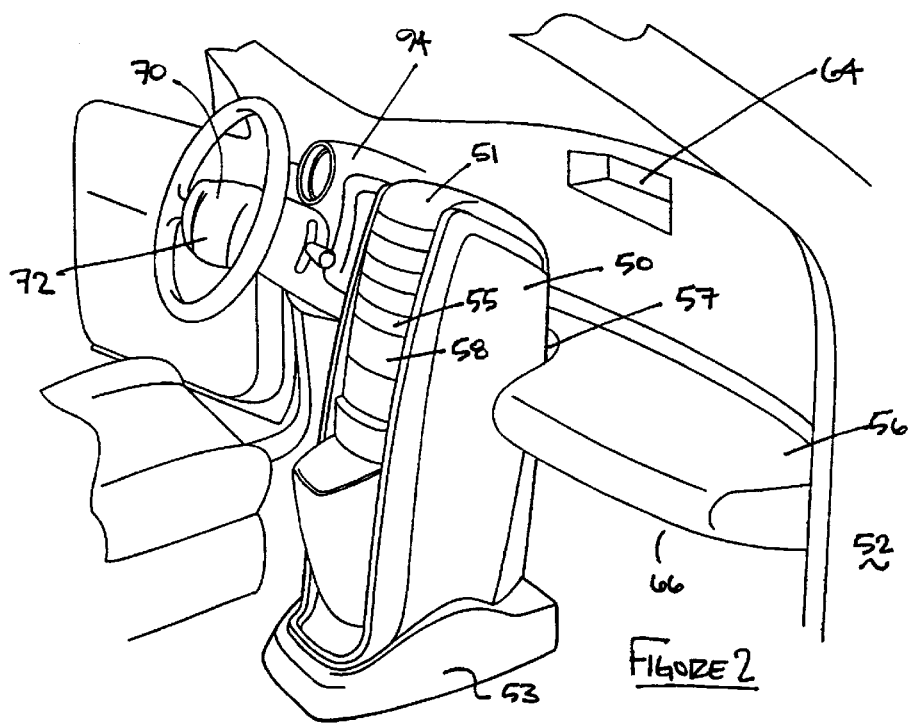

The following description of the preferred embodiments is merely exemplary in nature and is no way intended to limit the invention, or its application, or uses.

Referring to FIGS. 1–5, there is shown a center stack assembly 50 which is located in the front cockpit area 52 of the vehicle 47, and is preferably supported by the floor 54 of the vehicle 47. The center stack assembly 50 is supported separate from and can provide support to the cowl or instrument panel 56 if desired. By providing a centralized location for accommodating a wide variety of required and optional features in the front cockpit area 52 which is independent of the instrument panel 56, the instrument panel 56 itself is less complex and reduced in weight. The reduced weight of the instrument panel 56 (particularly in a traditional overhanging, cantilever supported system) minimizes the instrument panel's 56 susceptibility to resonance at low frequencies which may be incurred while driving. The content of the center stack assembly 50 is flexible and by providing interchangeable modules 58, can be customized by the customer, adapted to incorporate newly developed features by a dealer, or provide flexibility for the original equipment manufacturer to provide multiple levels of content at the assembly plant while maintaining a common support structure. A variety of snap-in type modules 58 can provide connection to power or communication contacts or buses located in the center stack structure to integrate the systems in the vehicle by utilizing a "plug and play" type approach. Further, the center stack assembly 50 provides an overall increased volume for packaging of large items (such as subwoofers) when compared to the traditional package available in an instrument panel. This packing efficiency is available because of the rearward projection toward and between the front seat assemblies which allows the instrument panel surface to be farther forward in the vehicle and provide a greater space for the occupants.

A further advantage of providing the centrally located content within the center stack assembly 50 is that the instrument panel 56 can be easily adapted to provide right-hand drive or left-hand drive vehicles with minimal change to the remainder of the vehicle. A common center stack assembly 50 can be utilized regardless of whether the vehicle is a right-hand drive or a left-hand drive vehicle while still providing ergonomically correct and accessible positions for the contents of the center stack assembly 50.

Center stack assembly 50 is characterized by its shape, which add both decorative and functional improvements to the system. The center stack assembly 50 has a top surface 51 which is located forward in the front cockpit area 52 from the bottom portion 53 of the center stack assembly 50. The center stack assembly 50 further has a front face 55 which defines a gradual slope between the top 51 and bottom portion 53 of the center stack assembly 50. In addition to the aesthetic aspects of the shape of the center stack assembly 50, the gradual slope of the front face 55 allows for an occupant positioned in the front seat 59 easy access to the various service modules 58. The top 51 and bottom 53 as well as sides define a central cavity 101.

Features which are incorporated within the center stack are intended to include, but are not limited to the hazard flasher switch and module, the audio system and controls, HVAC controls and distribution components, cup holders, lockable storage, ash receivers, cigar lighters, power ports, open storage bins, subwoofer modules, and RF receiver modules including vehicle security and vehicle information displays.

Referring again to FIGS. 1 and 2, the instrument panel 56 of the present invention is shown. As opposed to a traditional instrument panel, the present invention effectively provides a trim panel which extends substantially from the lower edge of the windshield 60 and provides aesthetic and acoustic shielding from the front of dash 62 structure of the vehicle. In a preferred embodiment of the present invention, the instrument panel 56 provides a centrally located display 64 which displays a wide variety of information to the driver or front seat passenger of the vehicle. The display 64 can be limited to the type of information which can be displayed, or can be completely programmable depending upon the intended use and which optional module has been incorporated in the vehicle.

The instrument panel 56 further includes a cross-car structural beam 57 (shown in FIG. 9*a*) which is integrated with a knee bolster 66 support to improve the occupant protection within the vehicle. Duct work for the HVAC system (not shown) can be integrated within the instrument panel 56, as well as additional distribution controls or mechanisms which are not included in the center stack assembly 50 (as previously described). While a passenger side airbag assembly 68 can be located within the instrument panel 56, the preferred embodiment would locate the passenger side airbag 68 in the center stack assembly 50, while the driver side airbag 70 would be included in the steering wheel hub 72, as described below.

One benefit of reducing the content within the instrument panel 56 itself is the ability to transfer items traditionally located elsewhere in the vehicle to the instrument panel 56. One example is shown in FIGS. 9*a* and 9*b* where the parking brake lever 78 and mechanism 80 is shown incorporated on a lower surface 82 of the instrument panel 56. Traditionally, the parking brake lever or handle 78 has been located on the inboard or outboard side of the driver seat 59 and thereby occupies valuable floor space in that vicinity. Alternately, parking brake foot actuated pedals 84 have been mounted on the lower cowl 86 side below the instrument panel 56. This location occupies space where the driver may wish to rest their foot and prevents the incorporation of a foot rest or support to improve the driver's comfort during long drives or aggressive maneuvers. Depending upon the particular use, the parking brake handle 78 and a release mechanism 80 can be horizontally positioned or vertically positioned with equal results. Preferably, the mechanical attachment of the parking brake mechanism 80 extends to the structure of the front of dash or cross-car beam support 57 of the instrument panel 56 to provide the structural rigidity required.

Referring now to FIGS. 1 and 9, the steering column assembly 81 of the present invention is shown. The steering column assembly 81 includes, but is not limited to, a steering wheel 88 having a hub 72 mounted driver side airbag 70, a multi-function stalk control 90 for controlling commonly utilized features, and an electronic "paddle shifter" system 92. The stalk control 90 incorporates features which are commonly used by the driver including turn signals, wiper/washers, headlight on/off, headlight bright/dim, and other features such as cruise control. The paddle shifter system 92 allows for sequential selection of the vehicle gears (PRNDL) by actuating for example, the right paddle one time to go from park to reverse and two additional times to go from reverse to drive. Manual transmissions can also be utilized in conjunction with the paddle shifters 92 where for example, right paddle actuation causes the vehicle transmission to up-shift or shift to a higher gear (first gear to second gear) and the left paddle causes the vehicle transmission to down-shift (from second gear to first gear). The steering column assembly 81 is positionable on either the left hand side of the center console 50 or the right hand side of the center console 50 for left or right hand drive vehicles, respectively.

Figure 3:
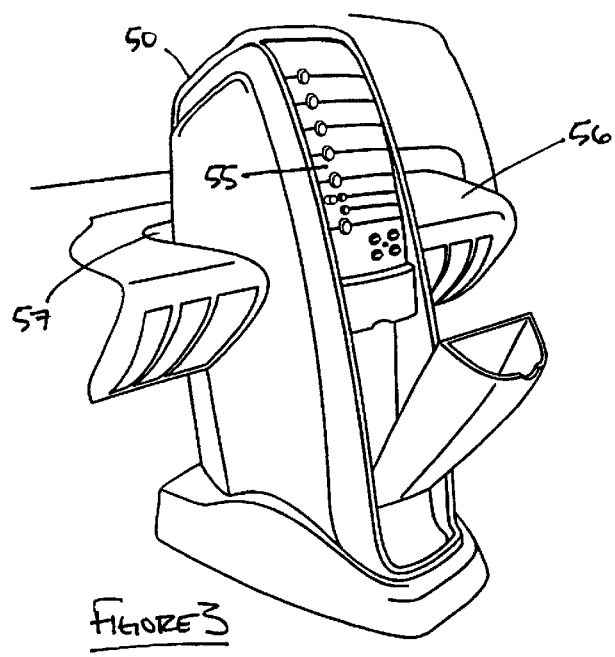
FIGS. 3–5 show a variety of views of the center stack assembly in accordance to the teachings of the present invention.
Figure 4:
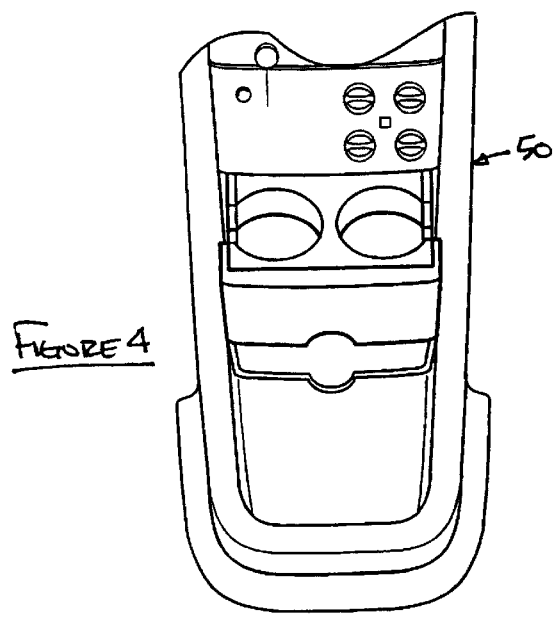
Figure 5:
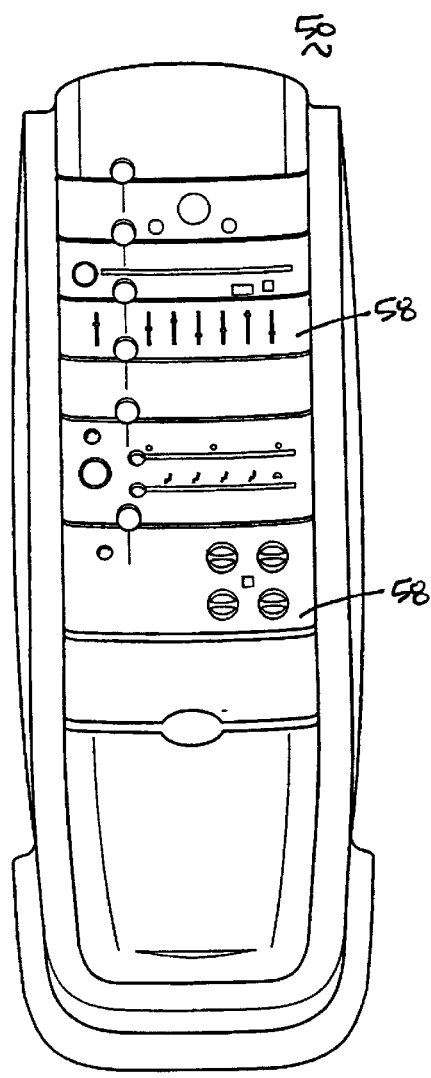

As can be seen in FIGS. 3–5, the center stack assembly 50 is configured to easily accept many various types of service modules 58. It is specifically envisioned that the center stack assembly 50 be configurable by an automobile manufacturer to have various adaptable configurations depending on a vehicle model or a specific options package. The center stack assembly 50 allows the automobile manufacturer or dealer to quickly modify the options in a vehicle prior to sale. The center stack assembly 50 is capable of receiving at least one service module such as a hazard button, an AM-FM stereo, HVAC controls, a lockable storage unit, an ash tray, a power port, an open bin, a subwoofer module, a plug and play bus system, a security key port, power window switches, GPS system, cup holder, and a programmable controller such as a HOME LINK® system.

Depicted in FIGS. 6*a*–6*c* is a perspective view of the center stack assembly 50 slidably receiving service modules 58 therein. As can be seen FIG. 6*a*, each service module has disposed on its side 98 a coupling mechanism 100. The coupling mechanism 100 can take various forms such as a C-channel of a tongue and groove disposed in either the service module 58 or in the inside surface 102 of the center stack assembly 50.

FIGS. 7*a*–7*c* depict various coupling mechanism which can be used to couple varying service modules to the center stack assembly 50. As is shown, a varying number of styles such as tongue and groove or dovetails can be used to capture and support the various service modules 58. The center stack assembly 50 includes left and right module guides 48 and 49 located on the inside surface 102. The module guides 48 and 49 can be a single unit made of a heat conductive metal, such as aluminum and include a plurality of parallel tabs 103 and 105 extending from front to back that define a groove 106 therebetween each tab 103 and 105. Each service module 58 includes a pair of side tabs 108 that is inserted in one of the grooves 106 in the module guides 48 and 49. When the service module 58 is slid into the center stack assembly 50, an electrical connector is connected with a mating electrical connector (not shown) at the back of the center stack assembly 50 to provide the desired electrical connection. Multiple service modules 58 are slid into the center stack assembly 50 in a parallel format to provide the overall electrical system. It is generally desirable to set the spacing of the module grooves 48 and 49 and the thickness of the service modules 58 to allow as many modules as possible to be stored in the center stack assembly 50 to conserve space.

Many of the service modules 58 generate heat during operation. The center stack assembly 50 therefore provides assisted cooling for the service modules 58 to draw away the heat. To provide the cooling, forced air is caused to circulate across the module guides 48 and 49 to draw heat away from the service modules 58.

FIG. 8 depicts the instrument panel assembly of the current invention having a deploying passenger airbag. It is envisioned that the airbag assembly can either be incorporated into the center stack assembly 50 or inserted therein as a service module 58.

Also included within the steering column assembly 81 is an instrument cluster 94, which preferably contains essential or primary instruments to minimize the weight and provide a simplified view for the driver. The instrument cluster 94 moves with the steering column if the height or angle of the steering column is adjusted. The instrument cluster 94 is separately pivotal relative to the steering column to provide an improved viewing angle for the driver. Alternatively, a head-up display 96 can be incorporated into the instrument panel or, preferably, into the center stack assembly to further minimize the weight and clutter of the steering column assembly. As shown in FIGS. 1 through 9, a wide variety of features can be utilized in the various innovative systems disclosed and described above.

It is to be understood that the invention is not limited to the exact construction illustrated and described above, but that various changes may be made if not thereby departing from the scope of the invention as defined in the following claims.

What is claimed is:

1. An instrument panel assembly for use in a vehicle, said instrument panel assembly comprising:
   a generally symmetric upper cowl portion defining a centrally located cutout region;
   a center stack assembly mounted on a floor of the vehicle and disposed within the center cutout region, said center stack assembly operable to receive a plurality of service modules; and
   a plurality of guide members coupled to a cavity within the center stack assembly and adapted to slidably receive the plurality of service modules in a stacked configuration.

2. The instrument panel assembly of claim 1 further having a base portion supporting said center stack assembly.

3. The instrument panel assembly of claim 1 wherein said center stack assembly is operable to slidably receive said plurality of service modules.

4. The instrument panel assembly of claim 1 wherein said center stack assembly defines a central cavity, said central cavity having a plurality of coupling members for receiving said plurality of service modules.

5. The instrument panel assembly of claim 1 wherein the service module is a hazard button.

6. The instrument panel assembly of claim 1 wherein the service module is an AM-FM stereo.

7. The instrument panel assembly of claim 1 wherein the service modules are HVAC controls.

8. The instrument panel assembly of claim 1 wherein the service module is a lockable storage unit.

9. The instrument panel assembly of claim 1 wherein the service module is an ash tray.

10. The instrument panel assembly of claim 1 wherein the service modules is a power port.

11. The instrument panel assembly of claim 1 wherein the service module is an open bin.

12. The instrument panel assembly of claim 1 wherein the service module is a subwoofer module.

13. The instrument panel assembly of claim 1 wherein the service module is a plug and play bus system.

14. The instrument panel assembly of claim 1 wherein the service module is a security key port.

15. The instrument panel assembly of claim 1 wherein the service modules are power window switches.

16. The instrument panel assembly of claim 1 further comprising a knee bolster and a cross-car beam disposed therein.

17. The instrument panel assembly of claim 1 wherein said center stack assembly further includes a GPS sensor module.

18. The instrument panel assembly of claim 1 wherein said center stack assembly further includes a programmable controller.

19. The instrument panel assembly of claim 1 wherein said center stack assembly further includes a cup holder.

20. The instrument panel assembly of claim 1 further comprising a steering wheel module having a steering wheel coupled to a base member, said base member being coupled generally to said symmetric upper cowl portion.

21. The instrument panel assembly of claim 1 further comprising a steering wheel module having an airbag module and a stalk control.

22. The instrument panel assembly of claim 21 wherein the steering wheel module is at least partially disposed on the upper surface of the instrument panel assembly.

23. The instrument panel assembly of claim 22 wherein the steering wheel module further includes a heads-up display.

24. The instrument panel assembly of claim 1 wherein the instrument panel assembly has a lower cowl portion having a parking brake coupled to a cross-car beam.

25. The instrument panel assembly of claim 20 wherein said steering wheel is operable to being positioned on one of either a left or right upper cowl and allows the vehicle to be either a left hand or right hand drive vehicle.

26. A center stack assembly for use in a vehicle, said center stack assembly comprising:
    a top portion and a base portion;
    a first and second sidewall coupled to the top and base portion;
    at least one module guide coupled to at least one of the first and second sidewall;
    a central cavity defined by the top, base and side portions; and
    a plurality of service modules which are operable to be slidably received in the central cavity in a stacked configuration by the module guide.

27. The center stack assembly of claim 26 wherein at least one of said plurality of service modules is selected from a group consisting of a hazard button, an AM-FM stereo, HVAC controls, a lockable storage unit, an ash tray, a power port, an open bin, a subwoofer module, a plug and play bus system, a security key port, and power window switches.

28. The center stack assembly of claim 27 further having a front facial surface which is generally sloping toward the front of the vehicle.

29. The center stack assembly of claim 27 further having a plurality of connectors capable of receiving said service modules.

30. The center stack assembly of claim 26 wherein the plurality of service is modules include one or more of a hazard button, an AM-FM stereo, HVAC controls, a lockable storage unit, an ash tray, a power port, an open bin, a subwoofer module, a plug and play bus system, a security key port, and power window switches.

31. The center stack assembly of claim 26 wherein the service module is an AM-FM stereo.

32. The center stack assembly of claim 26 wherein the service module is an HVAC controls.

33. The center stack assembly of claim 26 wherein the service module is a lockable storage unit.

34. The center stack assembly of claim 26 wherein the service module is an ash tray.

35. The center stack assembly of claim 26 wherein the service module is a power port.

36. The center stack assembly of claim 26 wherein the service module is an open bin.

37. The center stack assembly of claim 26 wherein the service module is a subwoofer module.

38. The center stack assembly of claim 26 wherein the service module is a plug and play bus system.

39. The center stack assembly of claim 26 wherein the service module is a security key port.

40. The center stack assembly of claim 26 wherein the service modules are power window switches.

41. The center stack assembly of claim 26 further comprising a knee bolster and a cross-car beam disposed therein.

42. The center stack assembly of claim 26 wherein said center stack assembly further includes a GPS sensor module.

43. The center stack assembly of claim 26 wherein said center stack assembly further includes a programmable controller.

44. The center stack assembly of claim 26 wherein said center stack assembly further includes a cup holder.

* * * * *

UNITED STATES PATENT AND TRADEMARK OFFICE
CERTIFICATE OF CORRECTION

PATENT NO. : 6,709,041 B1
DATED : March 23, 2004
INVENTOR(S) : James T. Hotary, David B. Busch and Michael E. Wiedeman It is certified that error appears in the above-identified patent and that said Letters Patent is hereby corrected as shown below:

<u>Column 6,</u>
Line 67, following "service" delete "is".

Signed and Sealed this

Eleventh Day of January, 2005

JON W. DUDAS
*Director of the United States Patent and Trademark Office*